United States Patent [19]

Kataoka et al.

[11] 4,442,231

[45] Apr. 10, 1984

[54] AMINOPHOSPHONIC ACID CHELATE RESIN

[75] Inventors: Yushin Kataoka; Masaaki Matsuda; Masaru Kamoda, all of Niihama, Japan

[73] Assignee: Sumitomo Chemical Company, Limited, Osaka, Japan

[21] Appl. No.: 369,088

[22] Filed: Apr. 16, 1982

[30] Foreign Application Priority Data

Apr. 23, 1981 [JP] Japan ............................ 56-62198

[51] Int. Cl.³ .................. B01J 39/20; C08F 8/40; C08F 8/30
[52] U.S. Cl. ............................ 521/32; 521/31; 521/36
[58] Field of Search ...................... 521/32, 36

[56] References Cited

U.S. PATENT DOCUMENTS

| | | | |
|---|---|---|---|
| 4,002,564 | 1/1977 | Earbonel et al. | 521/30 |
| 4,097,420 | 6/1978 | Mikes et al. | 525/328.5 |
| 4,277,566 | 7/1981 | Kataoka et al. | 521/32 |

FOREIGN PATENT DOCUMENTS

| | | |
|---|---|---|
| 65120 | 11/1982 | European Pat. Off. . |
| 8598341 | 1/1961 | United Kingdom . |
| 2040950 | 9/1980 | United Kingdom . |

OTHER PUBLICATIONS

Makromol. Chem. 128, 229–235 (1969).
J. Appl. Chem. 8, Jul., 465–468 (1958).
Chem. Abstr. 85:125027a (1976).

*Primary Examiner*—Joseph L. Schofer
*Assistant Examiner*—Peter F. Kulkosky
*Attorney, Agent, or Firm*—Stevens, Davis, Miller & Mosher

[57] ABSTRACT

An aminophosphonic acid chelate resin, prepared by reacting an amino resin having amine-reactive groups (A) with an amino compound having one or more primary and/or secondary amino groups (B) to produce an aminated resin and subsequently reacting thus produced aminated resin with an alkylphosphonation agent (C), shows excellent adsorption ability of metal ions having low atomic weights such as calcium ions, magnesium ions, etc., when applied to a solution having high salt concentration.

4 Claims, No Drawings

AMINOPHOSPHONIC ACID CHELATE RESIN

The present invention relates to an aminophosphonic acid chelate resin, a process for producing said chelate resin and a method for removing one or more metal ions from a solution or gas containing these metal ions by using said chelate resin. More particularly, this invention relates to an aminophosphonic acid chelate resin having high ability of removing metal ions.

Chelate resins remove metal ions selectively from a solution containing metal ions and are favoritely used as agents for removing metal ions from industrial water and waste water.

For this purpose, there has been proposed to use an aminophosphonic acid chelate resin prepared by chloromethylating and aminating a styrene-divinylbenzene copolymer and subsequently reacting with alkyl phosphonation agent (France Pat. No. 2,279,453). As compared with conventional iminodiacetic acid chelate resins, said chelate resin forms tighter complexes with metal ions, especially with low atomic weight ones such as calcium ions, magnesium ions, etc., and shows good adsorption abilities of these ions, but does not always show sufficient adsorption abilities, when applied to a solution having a high salt concentration. Consequently said chelate resin has disadvantages in that a large quantity of said resin is need and construction or running of an removing equipment costs high, when applied to a large quantity of a solution.

The present inventors have studied extensively to produce a chelate resin having a higher adsorption ability of calcium ions, magnesium ions, etc. comparing with known aminophosphonic acid chelate resins, especially when applied to a solution having a high salt concentration, and accomplished this invention.

The present invention provides a novel aminophosphonic acid chelate resin prepared by reacting an amino resin having amine-reactive groups (A) with an amino compound having one or more primary and/or secondary amino groups (B) to produce an aminated resin and subsequently reacting thus produced aminated resin with an alkylphosphonation agent (C). The present invention also provides a process for producing the chelate resin.

As the amino resin (A) which is used as the base resin when producing the aminophosphonic acid chelate resin of the present invention, there can be used a halogen-containing amino resin prepared by chloromethylating a styrene copolymer (e.g., styrene-divinylbenzene copolymer, chlorostyrene-divinylbenzene copolymer, bromostyrene-divinylbenzene copolymer, styrene-ethylene copolymer, styrene-vinylchloride copolymer, styrene-methylacrylate copolymer, etc., or a mixture thereof) and reacting with alkylamine or amino alcohol compounds (e.g., trimethylamine, triethylamine, dimethylamine, diethylamine, methylamine, ethylamine, dimethylaminoethanol, diethylaminoethanol, methylaminoethanol, ethylaminoethanol, etc., or a mixture thereof) and further reacting the resulting reaction product with a halogen (e.g., chlorine, bromine, iodine, etc., or a mixture thereof).

As the amino resin (A), there can also be used a resin prepared by reacting an amino compound (I) with a compound such as formaldehyde, epichlorohydrin, hexamethylene diisocyanate, 2,2-bis(p-1,2-epoxypropoxyphenyl) propane, etc., or a mixture thereof to produce an amino resin having primary and/or secondary amino group (II) and subsequently reacting thus produced amino resin with a polyfunctional compound having at least two amine-reactive groups or portions in the molecule such as halogen atoms, epoxy groups, isocyanate groups (III). Examples of the amino compounds (I) are aliphatic polyamines (e.g., ethylenediamine, diethylenetriamine, triethylenetetramine, tetraethylenepentamine, pentaethylenehexamine, tetramethylenediamine, pentaethylene-diamine, hexamethylenediamine, etc., or a mixture thereof), aromatic amines (e.g., aniline, paraphenylenediamine, metaphenylenediamine, ortho-phenylene-diamine, etc., or a mixture thereof), heterocyclic amines (e.g., 3-aminopyridine, 4-aminopyridine, 2-aminopyridine, etc., or a mixture thereof), amino acids (e.g., lysine, ornithine, etc., or a mixture thereof). Examples of the polyfunctional compounds (III) are epihalohydrins (e.g. epichlorohydrin, epibromohydrin, etc., or a mixture thereof), epoxy compounds (e.g., 2,2-bis(p-1,2-epoxypropoxyphenyl)propane, 1,4-bis(1,2-epoxypropoxy) benzene, etc., or a mixture thereof), halides (e.g., phosgene, thiophosgene, phthaloyl chloride, chloroacetyl chloride, etc., or a mixture thereof), isocyanates (e.g., hexamethylene diisocyanate, tolylene diisocyanate, etc., or a mixture thereof). There can be use the halogen-containing amino resins as the resin (A) preferably.

As the amino resin (II) to be reacted with the polyfunctional compounds (III) (hereinafter referred to as "adding agent of amine-reactive groups"), there can also be used commercially available ion-exchange resins which are mediumly or strongly basic. Examples of said chelate resins are "Duolite" (a trade name mfd. by Diamond Shamrock Corp.) A-101D, A-143, A-109, A-102D, A-161, A-161TR, A-162, A-171P, A-377, A-378, A-561, A-30B, A-340, A-374, A-132, ES-137, etc.; "Amberlite" (a trade name, mfd. by Rohm and Haas Co.) IRA-400, IRA-401, IRA-402, A-26, A-27, A-29, A-21, IRA-405, IRA-425, IRA-900, IRA-904, IRA-938, IRA-410, IRA-411, IRA-910, IRA-68, IR-45, IR-4B, IRA-93, etc.; "Diaion" (a trade name, mfd. by Mitsubishi Chemical Industries Ltd.) SA10A, SA10B, SA11A, SA11B, SA20A, SA20B, SA21A, SA21B, PA304, PA306, PA308, PA310, etc.; "Dowex" (a trade name, mfd. by Dow Chemical Co.) 1X, 2X, 11, 21K, MSA-1. Said amino resins can be used in the form of granules, beads preferably and also can be used in the form of fine powders, fibers, honeycombs, films, liquid, etc., according to applications of finally produced chelate resins.

The reaction of the amino resin (II) with the adding agent of amine-reactive groups can be carried out by known methods.

The reaction can be carried out in the absence of a solvent, or in the presence of a solvent such as water, or an organic solvent, e.g. chloroform, carbon tetrachloride, 1,2-dichloroethane, 1,1,2,2-tetrachloroethane or the like.

The reaction is usually carried out at about 0°–200° C., preferably 30°–150° C. When the reaction temperature is lower than about 0° C., the reaction rate is lowered, whereas when the reaction temperature is higher than 200° C., side reactions such as decomposition of the functional groups, etc. increase and the amount of amine-reactive groups contained in the resin (A) thus produced is undesirably lessened.

The reaction is usually carried out under atmospheric pressure and also can be carried out under increased pressure.

The adding agent of amine-reactive groups is used in an amount of 1/10 mole or more, preferably 1/5–10/1 moles, per equivalent weight of amino group in the amino resin (II). When the amount of said agent is more than that needed, recovery of unreacted agent undesirably becomes needed, whereas when less than that mentioned above, adsorption ability of metal ions of the finally produced chelate resin is undesirably lowered.

The reaction is usually carried out for about 0.1–24 hours. The reaction time is adjusted most appropriately within the range mentioned above, considering the reaction temperature, the amount and kind of the adding agent of amine-reactive groups, solvent and the amino resin (II). When halogen is used as the adding agent of amine-reactive groups, the reaction can be carried out either in the absence of a catalyst or in the presence of a catalyst such as benzoyl peroxide, t-butyl hydroperoxide, azobisobutyronitrile or the like. The reaction also can be carried out under the application of ultraviolet rays.

The amino resin (A) thus produced is reacted with the amino compound (B), as it is or after removing solvent and unreacted halogens or after further washing and drying, if necessary.

The amino compound (B) to be used for the reaction with the amino resin (A) may be any amino compounds which can react with said amino resin (A) to add one or more primary and/or secondary amino groups to the resulting reaction product. Examples of such amino compounds include ammonia, aliphatic mono- or polyamines, aromatic mono- or polyamines such as monomethylamine, monoethylamine, ethylenediamine, trimethylenediamine, tetramethylenediamine, pentamethylenediamine, hexamethylenediamine, octamethylenediamine, nonamethylenediamine, diethylenetriamine, triethylenetetramine, tetraethylenepentamine, hydrazine, ortho-phenylenediamine, meta-phenylenediamine, paraphenylenediamine, etc.

The reaction of the amino resin (A) with the amino compound (B) can be carried out in the absence of a solvent, or in the presence of a solvent such as water or an organic solvent, e.g., N,N-dimethylformamide, formamide, methanol, ethanol, or the like.

The reaction is usually carried out at from room temperature to 200° C., preferably at 50° to 150° C. When the reaction temperature is lower than room temperature, the reaction rate is lowered, and the reaction requires longer time. On the other hand, when it is higher than 200° C., side reactions such as decomposition of the amine-reactive groups, etc., increase and the amount of the amino compound (B) reacted with the amino resin (A) is undesirably lessened.

The reaction is usually carried out for about 0.1 to 7 hours. The reaction time can be adjusted most appropriately within the range mentioned above, considering the reaction temperature, the amount and kind of solvent and amino compound (B). The reaction is usually carried out under atmospheric pressure and also can be carried out under increased pressure.

The amino compound (B) is used in an amount of 1/20 mole or more, preferably 1/10–6/1 moles, per equivalent weight of the amine-reactive group in the amino resin (A). When the amount of the amino compound (B) is more than that needed, the recovery of unreacted amino compound (B) undesirably becomes necessary, whereas when less than that mentioned above, the substitution rate of amine-reactive groups to amino groups and metal collecting ability of the finally produced chelate resins are lessened.

Subsequently the aminated resin thus produced is reacted with the alkylphosphonation agent (C), as it is or after removing the solvent, non-reacted amino compound (B) or after further washing and drying, if necessary. The reaction of the aminated resin with the alkylphosphonation agent can be carried out by known methods. Said reaction of alkylphosphonation is carried out under different conditions according to the kind of alkylphosphonation agent. The reaction is carried out usually under following conditions.

When a halogenated alkylphosphonic acid such as chloromethylphosphonic acid, chloroethylphosphonic acid, etc., is used as the alkylphosphonation agent, the reaction is carried out in the presence of a basic catalyst such as pyridine, N,N-dimethylaniline, sodium hydroxide, potassium hydroxide, sodium carbonate, etc., using the halogenated alkylphosphonic acid in an amount of 1/10 mole or more, preferably 1/1–5/1 moles, per equivalent weight of the amino group in the aminated resin. The reaction is usually carried out in the presence of a solvent such as water, an organic solvent, e.g., methanol, ethanol, propanol, N,N-dimethylformamide, N,N-dimethylsulphoxide, 1,2-dichloroethane, 1,1,2-trichloroethane, pyridine, etc. The reaction is usually carried out at from room temperature to 150° C., for 0.1–24 hours.

When an alkylation agent such as formaldehyde, trioxymethylene and phosphonation agent such as phosphorous trichloride, phosphorous acid, hypophosphorous acid, methyl phosphite, ethyl phosphite, etc., are used as the alkylphosphonation agent, the reaction is usually carried out in almost the same conditions as mentioned above in the exception that the reaction is carried out in the presence of an acid type catalyst such as hydrochloric acid, sulfuric acid, etc. The resulting chelate resin thus produced can be used as it is or after washing and drying depending on its application. If necessary, the chelate resin may be treated with a base, salt, acid or oxidizing agent before use.

The novel aminophosphonic acid chelate resin thus produced can be particularly favorably applied for removing calcium and magnesium ions. Consequently, the chelate resin of this invention can be particularly favorably applied to the purification of an aqueous solution of alkali metal chloride used for electrolysis and to the removing of heavy metal ions from a solution such as a waste water or gas containing heavy metal such as mercury, cadmium, lead, chromium, zinc, copper, galium, indium, nickel, barium, uranium, etc.

As mentioned above, the chelate resin of the present invention has many advantages in that it has higher adsorption ability compared with conventional aminophosphonic acid chelate resins. Consequently it can be particularly favorably applied to the treatment of a large amount of solution, and construction and running costs of equipments are lessened. The chelate resin of this invention is of great industrial value.

The present invention is further illustrated below in detail with reference to Examples, but the invention is not limited thereto unless it departs from the essential feature of the invention. In Examples, all parts and percents are by weight unless otherwise specified.

EXAMPLE 1

A mixture of 40 parts of the ion-exchange resin "Duolite" A-101D which is strongly basic and has methylamino groups (CH₃)₃N- (produced by Diamond Shamrock Corp.) and one part of benzoyl peroxide and 100 parts of carbon tetrachloride as a solvent, was heated up to a temperature of 55°-60° C. and a chlorinating reaction was carried out for 2 hours by blowing chlorine gas into the mixture at a rate of 5 parts per hour and an amino resin having amine-reactive groups was produced. The resulting reaction product was filtered and the carbon tetrachloride was removed. Subsequently, to the amino resin thus produced, 100 parts of diethylenetriamine was added and the mixture was heated gradually up to 120° C. for 3 hours and the reaction was continued for 2 hours at 120°-130° C. and the resulting reaction product was filtered and washed to give 54 parts (undried) of an aminated resin. Subsequently, to 27 parts of the aminated resin thus produced, 21 parts of phosphorous acid and 43 parts of 36% conc. hydrochloride acid solution were added and heated up to 80° C. for 30 minutes. Then, 21 parts of 35% conc. formalin was added thereto and the reaction was carried out at 107°-112° C. for 4 hours and the resulting reaction product was cooled, filtered and treated with an alkali for 30 minutes by immersing in 50 parts by volume of 10% conc. aqueous solution of sodium hydroxide. The resulting product treated with alkali was filtered and washed with water to give 34 parts (undried) of chelate resin having aminoalkylphosphonate groups (hereinafter referred to as "the chelate resin A"). Ten parts by volume of the chelate resin A was filled in a column having 12 mm inner diameter and 28% conc. aqueous solution of sodium hydroxide containing 100 mg/l conc. of calcium was flowed from the top of the column at a space velocity (SV) 10 hr$^{-1}$. As a result, 83 mg of calcium was adsorbed to the chelate resin A until the concentration of clacium in the flux solution from the column (leak concentration) reached up to 3 ppm.

EXAMPLE 2

A mixture of 80 parts of the ion-exchange resin "Duolite" A-102D which is strongly basic and having amino groups

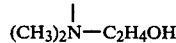
(CH₃)₂N—C₂H₄OH (produced by Diamond Shamrock Corp.), 200 parts of 1,1,2,2-tetrachloroethane as a solvent, 8 parts of sulfur and one part of iron chloride (II) was heated up to 100°-110° C. and chlorination reaction was carried out for 5 hours by blowing chlorine gas into the mixture at a rate of 6.3 parts per hour and an amino resin having chloridealkylamino groups as amine-reactive ones was produced. The resulting reaction product was filtered and 1,1,2,2-tetrachloroethane solvent was removed. Subsequently to the amino resin thus produced, 200 parts of tetraethylenepentamine was added and the mixture was heated gradually up to 135° C. for 2 hours and the reaction was continued at 130°-140° C. for one hour and the resulting reaction product was filtered and washed to give 153 parts (undried) of an aminated resin. Further, to 15.3 parts of the aminated resin, 4.2 parts of phosphorous acid, 8.6 parts of 36% conc. hydrochloride acid solution and 4.3 parts of 35% conc. formalin solution were added and the reaction was carried out at 97°-111° C. for 6 hours and the resulting reaction product was cooled, filtered and treated with an alkali for about 60 minutes by immersing in 10 parts by volume of 5% conc. aqueous solution of sodium hydroxide. The resulting product treated with the alkali was filtered and washed with water to give 24.2 parts (undried) of chelate resin having aminoalkylphosphonate groups (hereinafter referred to as "the chelate resin B"). Ten parts by volume of the chelate resin B was filled in a column having 12 mm inner diameter and 28% conc. aqueous solution of sodium chloride containing 100 mg/l conc. of calcium was flowed from the top of the column at a space velocity (SV) 10 hr$^{-1}$. As a result, 96 mg of calcium was adsorbed to the chelate resin B until the concentration of calcium in the flux solution from the column (leak concentration) reached up to 3 ppm.

EXAMPLE 3

A mixture of 100 parts of an ion-exchange resin "Sumikaion" KA-850 which is weakly basic and having amino groups:

—NHCH₂CH₂NHCH₂CH₂NH₂

(produced by Sumitomo Chemical Co.), 300 parts of chloroform as a solvent and 120 parts of epichlorohydrin was reacted for one hour at a temperature of 40°-60° C. to give an amino resin having amine-reactive groups. The resulting reaction product was filtered and unreacted epichlorohydrin, and the chloroform solvent were removed. Subsequently, the reaction of the amino resin thus produced with 100 parts of ethylenediamine and 10 parts of water was carried out for 6 hours while raising the temperature gradually from 80° to 125° C. to give an aminated resin. To 294 parts (undried) of the aminated resin thus produced, 100 parts of methyl phosphonate and 150 parts of 36% conc. hydrochloric acid solution were added and the resulting mixture was heated for 30 minutes at a temperature of 95°-100° C. After addition of 86 parts of 35% conc. formalin solution, the reaction was continued for 8 hours at a temperature of 100°-110° C. The resulting reaction product was cooled, filtered and treated with an alkali for about 15 minutes by immersing in 100 parts by volume of 10% conc. aqueous solution of sodium hydroxide. The resulting product treated with the alkali was filtered and washed with water to give 334 parts (undried) of a chelate resin having amino-alkylphosphonate groups (hereinafter referred to as "the chelate resin C"). The adsorption experiment was carried out in the same manner as Example 2 except that the chelate resin C was used as the chelate resin. As a result, 87 mg of calcium was adsorbed to the chelate resin C until the leak concentration reached up to 3 ppm.

EXAMPLE 4

A mixture of 40 parts of an ion-exchange resin "Duolite" A-161 which is strongly basic and having amino groups (CH₃)₃N— (produced by Diamond Shamrock Corp.), 100 parts of 1,2-dibromoethane as a solvent, and 20 parts of bromine liquid was reacted at a temperature of 45°-55° C. for 4 hours to give an amino resin having bromidemethylamino groups as amine-reactive groups. The resulting reaction product was filtered and 1,2-dibromoethane and unreacted bromine liquid were removed. To the amino resin thus produced, 100 parts of 30% aqueous solution of ammonia was added and the reaction was carried out for one hour while raising the temperature gradually from 80° to 120° C. under sealed condition. The resulting reaction product was filtered and washed to give 74 parts (undried) of an aminated resin. Subsequently, to 10 parts of the aminated resin thus produced, each 17 parts of disodium chloromethylphosphonate and water, and 12 parts of N,N-dimethylaniline were added and the reaction was continued for 7 hours at a temperature of 90°–100° C. The resulting reaction product was filtered and washed to give 16 parts (undried) of a chelate resin having aminoalkylphosphonate groups (hereinafter referred to as "the chelate resin D"). Then, 1000 parts by volume of 28% conc. aqueous solution of sodium chloride containing magnesium in a concentration of 100 mg/l and one part of the chelate resin D were contacted for one hour. As a result, 17 mg of magnesium was adsorbed to the chelate resin D after contacted.

EXAMPLES 5 TO 8 AND COMPARATIVE EXAMPLE 1

Each one part of the chelate resin A to D prepared in Examples 1 to 4 and a commercial chelate resin Duolite ES-467 (aminophosphonate type) was contacted for 30 minutes with 1000 parts by volume of 15% aqueous solution of sodium chloride containing cadmium with a concentration 100 mg/l and the solution was filtered and the concentration of cadmium in the filtered solution was measured, then the amount of cadmium adsorbed to each chelate resin was calculated. The results are shown in Table 1.

TABLE 1

|  | Kind of chelate resin | Adsorbed amount of cadmium mgCd/g-resin |
|---|---|---|
| Example 5 | Chelate resin A | 95 |
| Example 6 | Chelate resin B | 92 |
| Example 7 | Chelate resin C | 84 |
| Example 8 | Chelate resin D | 106 |
| Comparative Example 1 | Duolite ES-467 | 47 |

COMPARATIVE EXAMPLE 2

The adsorption abilities of a commercial aminophosphonate type chelate resin, Duolite ES-467, and a commercial iminodiacetic acid type chelate resin, UR-40, were tested in the same manner as Example 1. The amount of calcium adsorbed to the chelate resins until the leak concentration reached up to 3 ppm was 18 mg and 14 mg, respectively.

From above mentioned Examples 1 to 8 and Comaprative Examples 1 to 2, it is now clear that the chelate resins having aminophosphonate groups of this invention have large adsorption ability of metal ions such as calcium, magnesium, cadmium, etc., when applied to a solution of high salt concentration and thus the chelate resins are of great industrial importance.

What is claimed is:

1. A process for producing a chelate resin which comprises reacting an amino resin having amine-reactive groups (A) with an amino compound having one or more primary and/or secondary amino groups (B) to produce an aminated resin, and subsequently reacting the animated resin with an alkylphosphonation agent (C), the amino compound being used in an amount of 1/20 mole or more per equivalent weight of the amine-reactive group in the resin (A), the alkylphosphonation agent being used in an amount of 1/10 mole or more per equivalent weight of amino group in the aminated resin.

2. A process according to claim 1, wherein the amount of the amino compound (B) is 1/10 mole–6/1 moles per equivalent weight of the amine-reactive group in the resin (A) and the amount of the alkylphosphonation agent (C) is 1/1 mole–5/1 moles per equivalent weight of the amino group in the aminated resin.

3. A process according to claim 1, wherein the resin (A) is prepared by reacting an amino resin having one or more primary and/or secondary amino groups with a polyfunctional compound having at least two amine-reactive groups.

4. A chelate resin produced by reacting an amino resin having amine-reactive groups (A), with an amino compound having one or more primary and/or secondary amino groups (B) to produce an aminated resin, and subsequently reacting thus produced aminated resin with an alkylphosphonation agent (C), the amino compound being used in an amount of 1/20 mole or more per equivalent weight of the amine-reactive group in the resin (A), the alkylphosphonation agent being used in an amount of 1/10 mole or more per equivalent weight of amino group in the aminated resin.

* * * * *